United States Patent

[11] 3,612,245

| [72] | Inventor | Hikoji Noguchi |
| | | No. 10-1251, Narahashi, Ooaza, Yamato-cho, Kitatamagun, Tokyo, Japan |
| [21] | Appl. No. | 882,427 |
| [22] | Filed | Dec. 5, 1969 |
| [45] | Patented | Oct. 12, 1971 |

[54] APPARATUS FOR COORDINATING RANDOMLY PLACED EGGS RELATIVE TO A RECEIVING DEVICE
4 Claims, 15 Drawing Figs.

[52] U.S. Cl. ......................................... 198/33, 198/34
[51] Int. Cl. ........................................ B65g 47/24, B65g 47/26
[50] Field of Search ............................ 198/30, 33 AA, 34; 356/57

[56] References Cited
UNITED STATES PATENTS

| 2,687,208 | 8/1954 | Cox .............. | 198/37 |
| 3,118,548 | 1/1964 | Bliss ............. | 198/33 AA |

FOREIGN PATENTS

| 1,246,526 | 8/1967 | Germany ........ | 198/30 |
| 1,359,601 | 3/1964 | France ........... | 198/30 |

Primary Examiner—Edward A. Sroka
Attorney—Browdy and Neimark

ABSTRACT: An automatic apparatus for use with an egg-accommodating or storage equipment, said apparatus being adapted for coordinating eggs randomly placed on the supply section of the apparatus relative to said accommodating or storage equipment in a positive and easy manner so that the eggs may be stored with shorter sides, viz, blunt sides upwards to retard the degradation of the eggs as much as possible during their prolonged storage.

PATENTED OCT 12 1971 3,612,245

INVENTOR
Hikoji Noguchi
BY Brondy and Neimark
ATTORNEYS

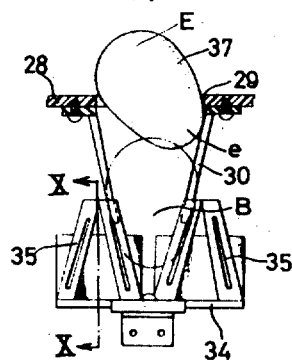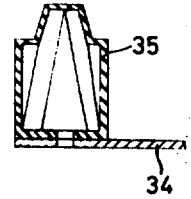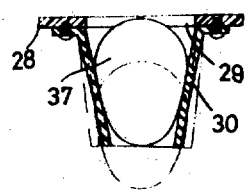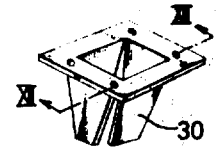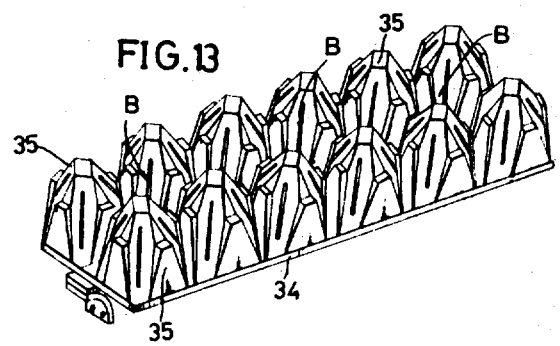

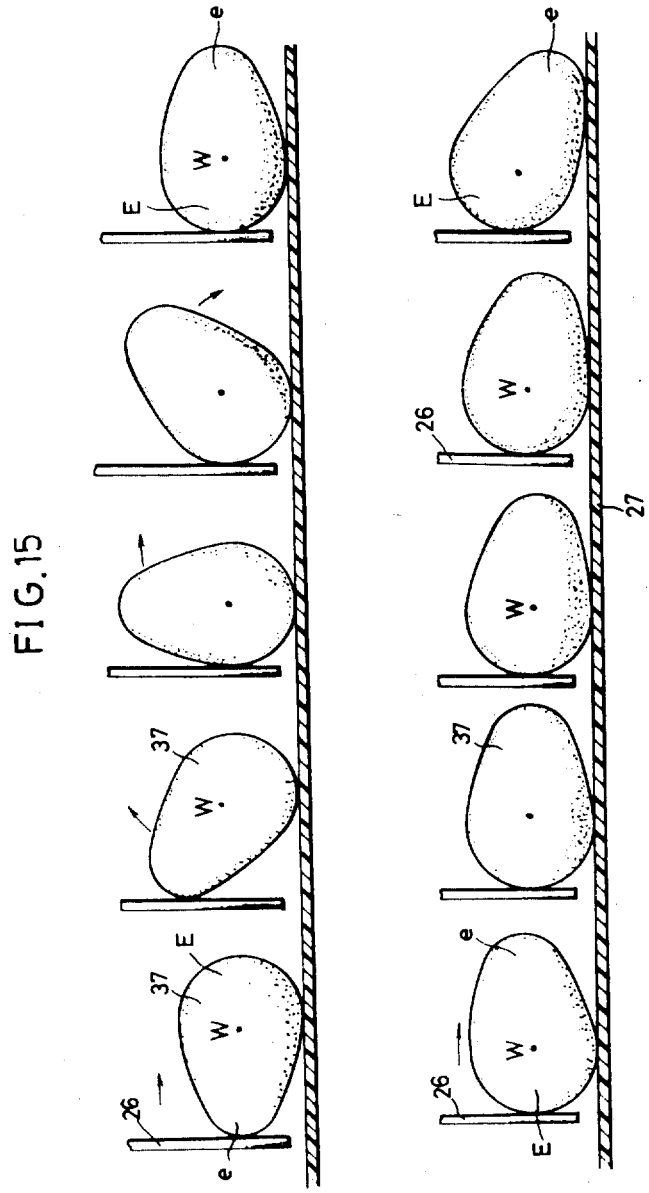

3,612,245

APPARATUS FOR COORDINATING RANDOMLY PLACED EGGS RELATIVE TO A RECEIVING DEVICE

The present invention relates to an apparatus adapted for coordinating randomly placed eggs relative to an egg accommodation or storage equipment.

It is well known that the respiratory organ of an egg is located in the blunt or shorter side thereof and it is absolutely necessary that the eggs should be stored with the blunt or shorter sides upwards where the eggs are to be preserved for any prolonged period of time.

In an automatic egg-packaging device so far known and utilized in the art, an auxiliary apparatus is usually provided for coordinating the eggs relative to the separate storage equipment so that the blunt or shorter sides of the eggs may be directed in the same sense. However, such known device is highly complicated and unsatisfactory in its operation.

The main object of the present invention is to provide such apparatus which does not suffer from the above-mentioned drawbacks and which is simple in construction and positive in operation.

Another object of the present invention is to provide such apparatus wherein means are provided for coordinating the predetermined number of eggs simultaneously relative to the storage or accommodation device.

Yet, another object of the present invention is to provide such apparatus wherein a specially designed guide device is provided for transferring the thus coordinated eggs onto a tray conveyor in safety.

These and other objects of the present invention will become more fully disclosed by the following detailed disclosure especially when read in conjunction with the accompanying drawings, in which FIG. 1 is a side elevation of the apparatus according to the present invention;

FIG. 9 is an explanatory view showing the egg being received in the recess defined by four adjoining projections on the transfer plate mounted on the third belt conveyor means;

FIG. 10 is a schematic view of the transfer plate, cut along the line X—X in FIG. 9;

FIG. 11 is a perspective view of the control plate means attached to the stationary plate;

FIG. 12 is an explanatory view illustrating the operation of the control plate means, cut along the line XII—XII in FIG. 11;

FIG. 13 is a perspective view of a transfer plate provided with a plurality of projections for receiving the eggs;

Figure 14:
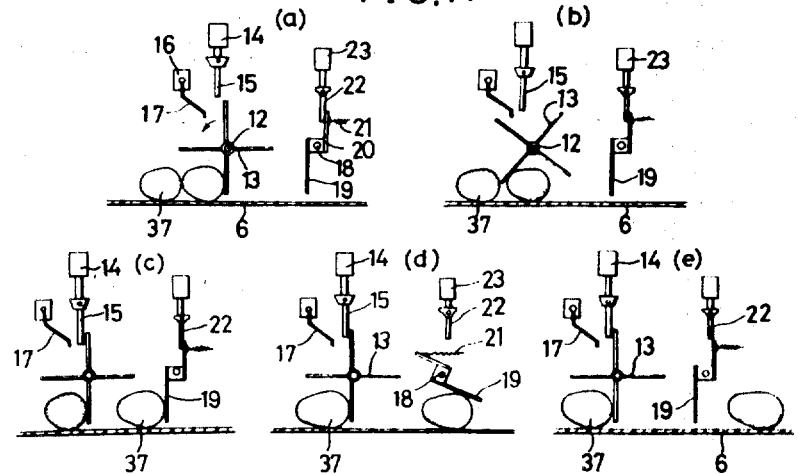

FIG. 14 (a) to (e) show the operation of the device being part of the present apparatus and adapted for bringing a predetermined number of eggs into alignment transversely of the proceeding direction of the first conveyor belt means; and FIG. 15 shows the operation of the device being part of the present apparatus and adapted for directing the longer sides of the eggs towards the proceeding direction of the eggs being forwarded on the stationary plate means.

Figure 1:
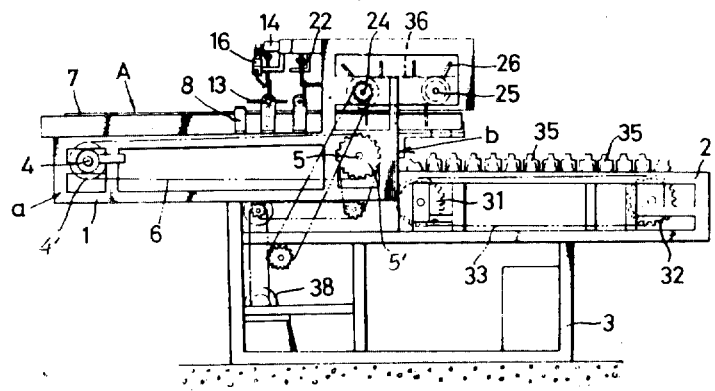

Referring now to FIG. 1, there is shown generally an elongated frame open at the top and provided with a device being part of the present apparatus adapted for coordinating the eggs randomly placed or supplied into the supply section of the apparatus. Contiguous to said frame 1, there is provided a further elongated frame 2 which houses a belt conveyor for the eggs conveyed through the above-mentioned device.

Figure 3:
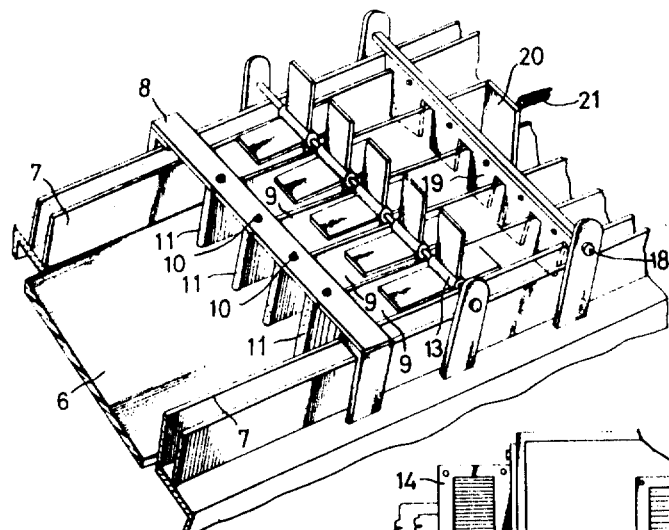
FIG. 3 is a perspective view showing part of the first belt conveyor means.

The lateral breath of the conveyor belt is so selected that a certain number of eggs can be placed thereon in alignment in a line transverse to the moving direction of the belt. Said frames 1, 2 are mounted in position on a support frame 3, as will be realized by referring to FIG. 1. Rotary shafts 4, 5 are mounted in parallel on the entrance side a and the exit side b of the frame 1, respectively. Said rotary shafts 4, 5 are secured to a pair of rolls 4', 5' respectively. An endless belt 6 entrained on said rolls 4', 5' has a width equal to the effective width of said frame 1 and the conveying reach of the belt 6 is adapted to receive and transport the eggs placed thereon manually or by means of a suitable supplying device. A pair of elongated rectangular guard frames 7, 7 are mounted on either side of the endless belt 6 and from end to end of the frame 1. Eggs are placed or supplied randomly to the supply section in A in FIG. 1, and arranged in a certain predetermined number of rows as they proceed thereon by means of a device comprising a number of partitioning bars 9, secured by nuts 10 onto a U-shaped member 8 which is mounted to said guard frames 7, 7 at right angles with the belt 6 and at a certain height from the latter so as to allow the passage of the eggs thereunder, as will best be realized by FIG. 3.

Said partitioning plates 9 are also spaced from the upper surface of the belt 6 by a certain clearance so that the latter may travel unimpeded while driven. Said partitioning plates 9 are arranged in parallel with the proceeding direction of the belt 6 so as to provide e.g. five parallel passages for the eggs placed or supplied to belt 6.

Felt linings 11 are fixed to the foremost parts of the partitioning bars 9 so as to avert the possible breakages of eggs being forwarded on the belt 6. Adjacent to the upper faces of the guard frames 7, 7, there is mounted a rod 12 carrying sleeves 13 rotatable thereon and having four blades fixed at right angles with each other. Said blades being so dimensioned as to receive one egg in a space defined by two adjacent blades. On top of each sleeve 13, there are equipped as many solenoids 14 as there are the sleeves 13. A movable member 15 is associated with the solenoid 14 so that it is caused to descend by its own gravity while the solenoid 14 is not energized and retard the further delivery of the eggs. Just ahead of the solenoids 14, there are mounted as many microswitches 16 as there are solenoids 14. The elongated tip of the actuating bar 17 of microswitch 16 is so positioned that it may be actuated by the blade 13 rotated with shaft 12.

A further shaft 18 is mounted horizontally to the right of shaft 12 in parallel therewith, said shaft 18 mounting an abutment plate 19 by the intermediary of an upper projecting piece 20. Said plate 19 is adapted for retarding the eggs temporarily from being conveyed along the partitioning bars 9, as will be more fully disclosed hereinafter. A spring 21 is secured at one end and the other end is attached to said piece 20 so as normally to urge the abutment plate 19 clockwise as will be realized from the drawing. A limiting bar 21' is further provided for limiting the movement of the abutment plate 19 further than the vertical position as shown in the drawing. Said abutment plates 19 are disposed in the spaces intermediate the adjoining bars 9 and are contoured in the shape of a comb. On top of the bar 19 there is provided a further solenoid 23, there being only one solenoid 23 for any desired number of the aforementioned solenoids 14 which are naturally provided in a number corresponding to the passages for eggs defined by the adjoining bars 9. The tip of a movable member 22 is so positioned that the piece 20 is thereby deterred from its rotation when said member 22 descends by its own gravity. To the right-hand side of the abutment plate 19 as shown in the drawing there is provided a further endless conveyor belt 36 a certain elevation from the above-mentioned belt 6 so as to allow the unhampered passage of the eggs from the latter onto a smooth stationary support plate 27 to be described. Said conveyor belt 36 is mounted on shafts 24, 25 and a plurality of pusher bars 26, 26 are attached at stated intervals to the belt 36. As will best be realized by referring to FIGS. 7 and 8, the conveying reach of the conveyor belt 6 does not extend to beneath the belt 36. In its stead, there is provided a smooth stationary plate 27 beneath said conveyor belt 36, said stationary plate 27 being provided at its right-hand side extremity a number of openings 29 through which the eggs are adapted to be dropped onto the reservoir 35 as will be described more fully hereinafter. Several control plates made of resilient or yieldable material are fitted around the peripheral parts of the openings 29, and serve for dropping the eggs in trim order through openings 29. Said stationary plate 27 mounts thereon the partitioning bars 9 thus guiding the eggs in good order as far as the openings 29.

Figure 2:
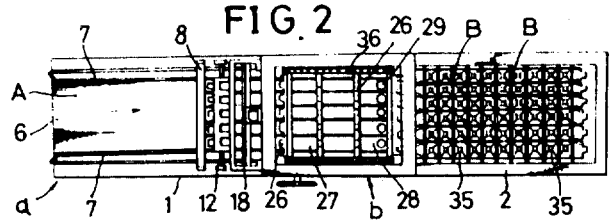
FIG. 2 is a plan view of the same.
Figure 5:
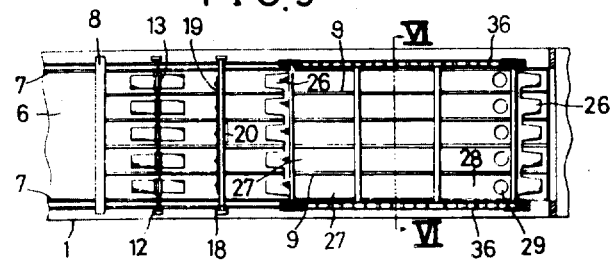
FIG. 5 is a plan view of the apparatus according to the invention with the third belt conveyor means omitted and part of the first belt conveyor means cut away for simplicity.
Figure 7:
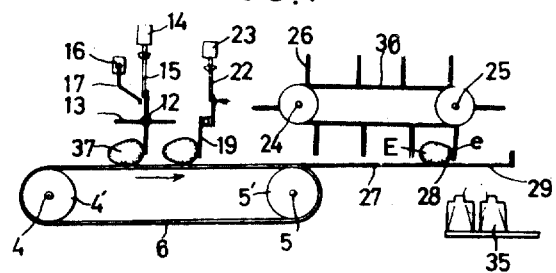
FIGS. 7 and 8 are schematic explanatory views illustrating the operation of the present apparatus.
Figure 8:
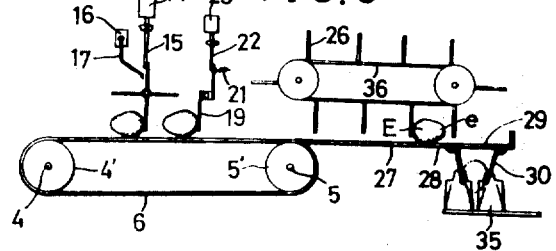

There is provided a chain sprocket conveyor belt 33 inside the frame 2 as shown in FIG. 1 said chain sprocket conveyor belt 33 being entrained on a pair of rotary wheels 31, 32. A plurality of transfer plates 34 are mounted by shaft to the chain sprocket conveyor belt 33; each of said transfer plates 34 comprised of several sets of receiving projections 35 and made from soft pliable material, such as rubber. The eggs supplied to said plates 34 via openings 29 on the plate 27 are received on parts B on the plates 34 defined by the adjoining four projections 35. The lowermost parts of the control plates 30 are extended in part into the recessed part B associated therewith, so that the eggs may be dropped into the recessed part B on the transfer plate 34 without the risk of possible breakages. Numeral 38 in the drawing denotes an electric motor operatively connected with the moving parts of the present apparatus. The operation of the present apparatus is as follows:

When a plurality of eggs 37, with the shorter or blunt end denoted at E and the long or acute end at e in the drawing, are supplied to the present apparatus, the motor 38 is set into operation for driving the shaft 5 and the driving roll 5' associated therewith, so that the endless belt 6 is driven in the direction shown by the arrow marks as shown in FIGS. 2 and 7.

Figure 4:
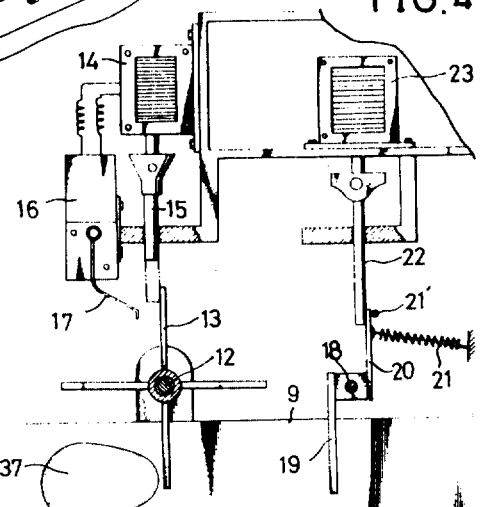
FIG. 4 is a side elevation of part of the apparatus according to the present invention.
Figure 6:
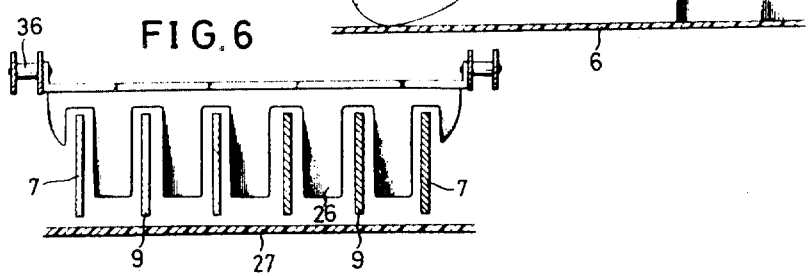
FIG. 6 is a sectional view of FIG. 5 along the line VI—VI therein.

The stored eggs 37 supplied onto the supply section A of the now moving conveyor belt 6 are conveyed on the belt 6 in a random state, viz., the eggs are not coordinated in readiness for reception by the transfer plates. The eggs 37 traveling on the conveyor belt 6 come into contact with the felt covers 11 of the partitioning bars 9 and are then delivered into the passages defined by the guard plates 7 and the partitioning bars 9. Then, the eggs are abutted against the one of the blades 13 which is in the downturned position. In this instance, the blade in its upturned position is kept from physical contact with the actuating bar 17 of the microswitch 16, as shown in FIG. 4 and FIG. 14 a, the solenoid being thus energized and the movable member 15 associated therewith being raised in its position and kept from physical contact with any of the blades 13. When an egg 37 being conveyed on the conveyor belt 6 abuts on the blade in its down position, the blade 13 gives under the urging force of the conveyed egg 37 which thus proceeds as far as the abutment plate 19 and comes to a halt. With the preceding movement of the egg 37, the rotary blade 13 which is then disposed in the vertically upward direction bears against the actuating bar 17 so as to rotate the same in the direction shown by the arrow mark in FIG. 14 a and deenergize the microswitch 16 associated therewith. Upon energization of the microswitch 16, the relay associated with the latter, not shown, is turned off and the solenoid 14 is deenergized. As a consequence, the movable member 15 descends by its own gravity. The operative position of the various members in this instance is shown in FIG. 14 b. From the position shown in FIG. 14 b, the egg 37 is conveyed further until it abuts the abutment plate 19 which is in its vertically down position, as shown in FIG. 14 c. The egg next to the above-mentioned egg 37 abuts on the blade 13 which is in its vertically down position, but the said blade 13 acts so as to hinder the further proceeding of the egg next to the preceding egg 37, since the blade which is in its vertically upward position is checked from rotation by the member 15 which is in its lowered position as shown in FIG. 14 c. On the other hand, the preceding egg 37 is also retarded from proceeding, as the piece 20 attached to the abutment plate 19 abuts on the member 22 which is now lowered in its position as also shown in FIG. 14 c. It will be appreciated that the above-described procedure takes place simultaneously or with a certain time lag at each of the five passages defined by the partitioning bars 9 and the guard plates 7, 7. In effect, the preceding five eggs are aligned transversely of the proceeding direction of the conveyor belt 6 and in abutment with the abutment bars 19 arranged in each of said five passages. As will most clearly be assumed from FIG. 14 b, the preceding egg 37 is separated from the following one by the blade 13 which is then at its vertically down position. When the five blades 13 have actuated the bar 17 either simultaneously or with a certain time lag, the series-connected electric relays are closed simultaneously upon actuation of the five microswitches 16. Thus the solenoids 23 associated with the microswitches 16 are energized for raising the movable member 22 from its position.

The abutment plate 19 is caused to rotate against the force of spring 21 under the urging force of the proceeding egg 37, as shown in FIG. 14 d, the latter being simultaneously conveyed through the abutment plate 19. Upon passage of the preceding five eggs, the plate 19 is restored to its vertically down position, under the return force of the spring 21. The operative positions assumed by each of the moving members are shown in FIG. 14 e. When the plate 19 has been extended widest apart the further microswitch means, now shown, are turned on, while the separately provided timer means and the above-mentioned five relays are turned on simultaneously. Thus, the solenoid 23 is deenergized, thereby the member 22 is caused to descend by its own gravity and in readiness for abutment by the piece 20 attached to the bar 19 which is thus checked from rotation.

Although not shown on the drawing, the above-mentioned timer means $T_1$ are provided for actuating the relay and the further timer means, again not shown on the drawing, so as to drive the shaft 24, 25 and the endless belt 36.

The proceeding egg 37 being conveyed further on the endless belt 6 is transferred from the belt 6 onto the smooth stationary plate 27 and conveyed further in the forward direction through the intermediary of pusher bars 26 which are driven with the endless belt 36.

The eggs are placed on the stationary plate 27 in an arbitrary way, viz. they are not always arranged with their longer sides disposed in the forward direction, as desired in the embodiment shown in the drawing. When the egg 37 is arranged with the shorter side E in the forward direction, as shown in the upper half of FIG. 15, the pusher bar 26 abuts on the acute end of the egg 37, the center of gravity W of which is biased towards the blunt end of the egg 37. Thus, the shorter side E of the egg 37 is relatively light in weight and, moreover, the radius of curvature of this end is less than that of the opposite or blunt end, as a result, the egg 37 being easy to glide on the bar 26 is urged to rotate upwardly about 180° with the center of gravity W as its center until the pusher bar 26 abuts on the shorter side E of the egg 37, as indicated at the right-hand side of the upper half of FIG. 15.

On the other hand, where the egg 37 is placed on the stationary plate 27 with the longer side e in the forward direction, the center of gravity W is biased towards the back as seen in the proceeding direction of the egg and the radius of curvature of such end is larger than that of the opposite acute end e. Thus the egg 37 being now contacted on the wider area of the pusher bar 26 is caused to glide at the same position on the plate 27 from the start to the end of its travel on the plate 27.

In this way, the five preceding eggs 37 being conveyed on the stationary plate 27 may be aligned transversely thereof in the neighborhood of the terminal part of the plate 27. The eggs 37 thus arranged are pushed into the openings 29 on the terminal part of the plate under the urging force exerted by the pusher bars 26. Thus, the eggs 37 drop onto the recessed part B defined by four adjoining projections 35 on the transfer plate 34 with the longer side e downwards. The impact which might otherwise be inflicted on the egg 37 may be alleviated by the projections 35 made from soft pliable material, such as rubber, the egg 37 being received snugly into said recessed part B by the cushioning effect afforded by said projections 35.

Control plates 30 made of soft and yieldable material and mounted around the peripheral part of the opening 29 serve for guiding the egg 37 without the risk of breakage while the egg is dropped via opening 29 and received into recessed part B.

When the timer $T_3$ has operated for an interval of 0.5 to 1 second, which time interval corresponds to the time that the egg is snugly received into the recess defined by the adjoining projections 35, the chain sprocket belt 33 starts to proceed by the intermediary of the relay, not shown, until it proceeds for a distance of about 50 mm. corresponding to the distance about equal to the length of the egg placed horizontally and halted by the intermediary of a microswitch, not shown, said microswitch being operated upon the certain predetermined progress of the chain sprocket belt 33 through the means not shown on the drawing.

The eggs 37 being thus conveyed on the transfer plates 34 are accommodated into a suitable receptacle at the extreme right-hand side of the apparatus.

It is to be noted that the foregoing functional description has been limited to one operating cycle but the above-mentioned procedure may be carried into effect repeatedly. It will be apparent from the foregoing disclosure that the eggs supplied arbitrarily may be coordinated with respect to the receiving device in an easy manner, by the intermediary of the microswitches electrical relays and timer means, in a known manner per se.

What is claimed is:

1. An apparatus for coordinating randomly placed eggs relative to a receiving device, which comprises a moving belt with a horizontal run provided to a frame which has an opening above the belt and adjacently to an end opposite to the moving direction of the belt for receiving eggs randomly supplied onto the belt, said belt having a width sufficient to allow the eggs to stand in a predetermined number of rows, a plurality of stationary gates corresponding to the number of said rows and extending in parallel to the moving direction of the moving belt and a plurality of partitions extending between the gates in the direction transverse to the moving direction of the moving belt, said partitions being electrically actuated to allow the eggs to pass through the partitions intermittently one by one, whereby the eggs are coordinated in the directions parallel as well as transverse to the moving direction of the moving belt, a stationary plate having a smooth surface connected to the other end of the horizontal run of moving belt at a level substantially equal to said horizontal run and provided with gates corresponding to the aforementioned plurality of stationary gates, and a plurality of pushers each having a smooth front surface and extending between the second-mentioned gates in the direction transverse to the moving direction of the moving belt, said pushers being moved in the moving direction of the moving belt at a predetermined speed to permit them to receive the coordinated eggs one by one in front of their smooth front surfaces and being arranged to push the eggs over the smooth surface of the stationary plate for a predetermined period of time, whereby the eggs rotate about their center of gravity and their shorter or blunt sides come to abut against the smooth surface of the stationary plate.

2. An apparatus in accordance with claim 1, in which sets of a plurality of pushers are provided on a moving endless belt with a space therebetween which substantially corresponds to the length of eggs.

3. An apparatus in accordance with claim 1, in which the stationary plate is provided adjacently at its end opposite to that connected to the horizontal run of the moving belt with a number of openings corresponding to the predetermined rows to receive eggs released from the pushers one by one, said openings being respectively provided with a tubular body having one end opened to the corresponding one of said openings and the other end open and having a resiliency sufficient to give a buffering effect to the egg released from the pusher and dropped thereinto with the end with its longer or acute end downward and to allow the egg to go therethrough by its own gravity.

4. An apparatus in accordance with claim 1, in which the receiving device comprises a number of recessed parts defined by four adjoining projections made from a soft pliable material, whereby the egg released from the pusher and dropped downwardly with its longer or acute end downward is resiliently received at said end.